United States Patent Office 3,092,018
Patented June 4, 1963

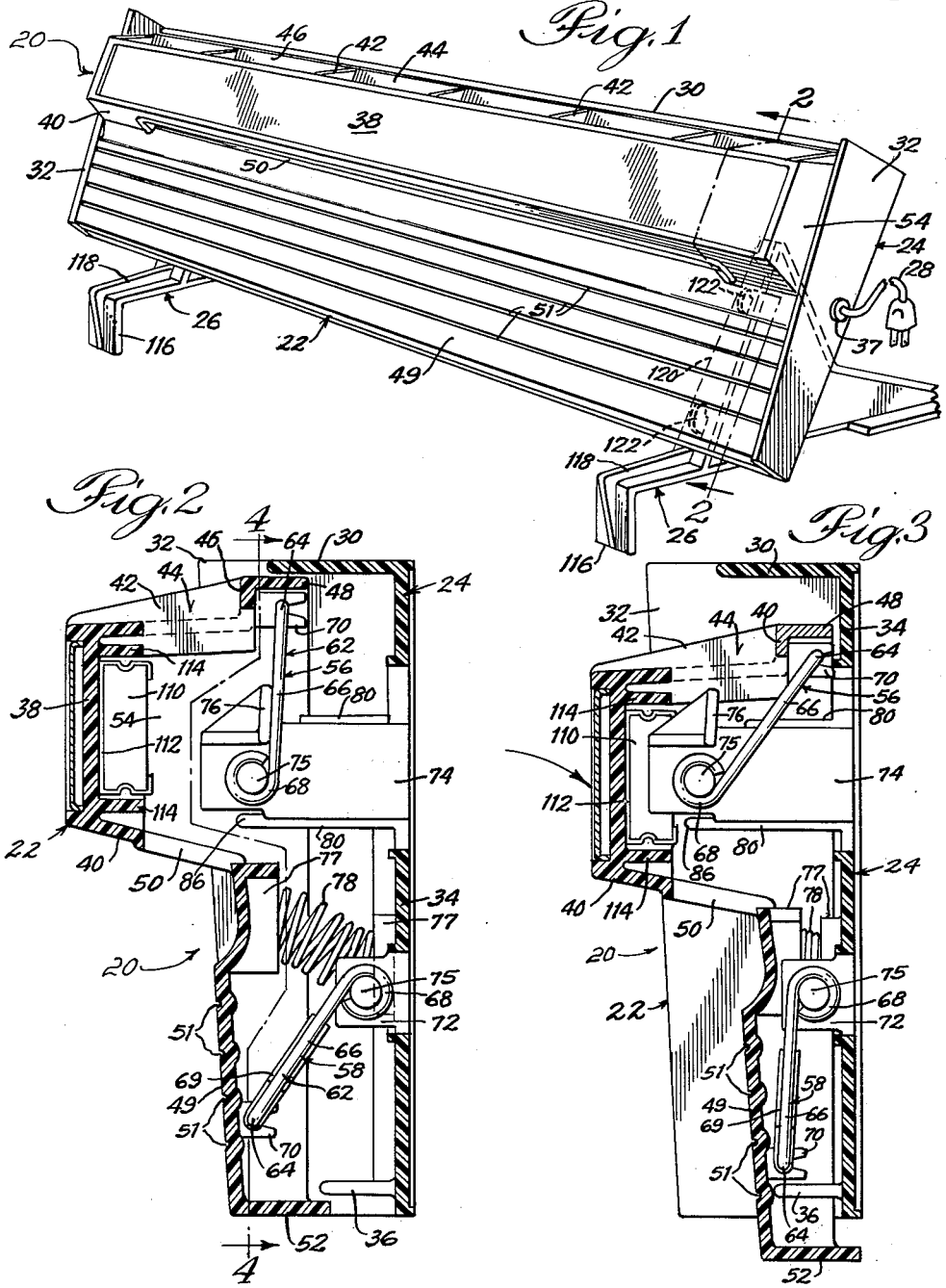

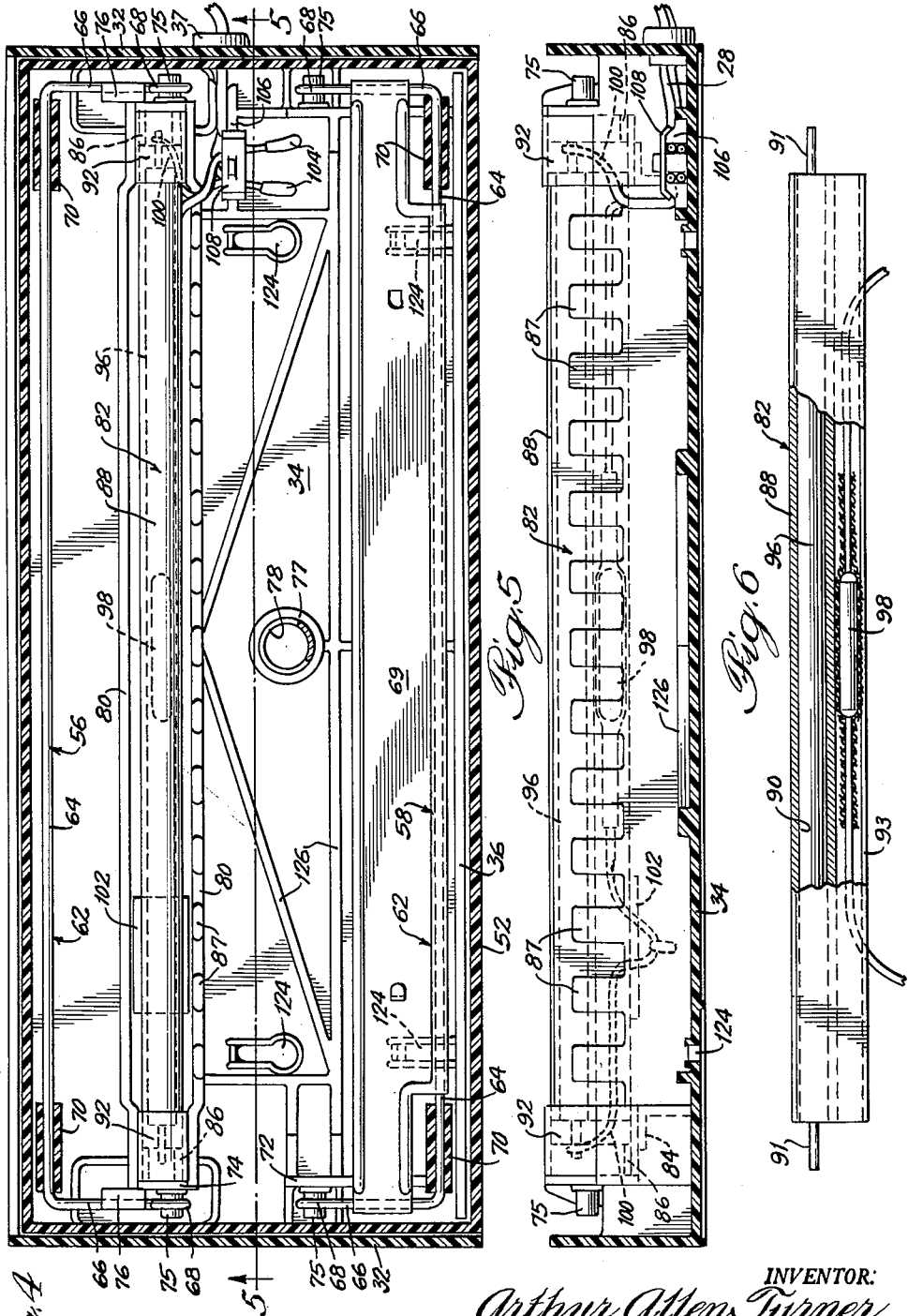

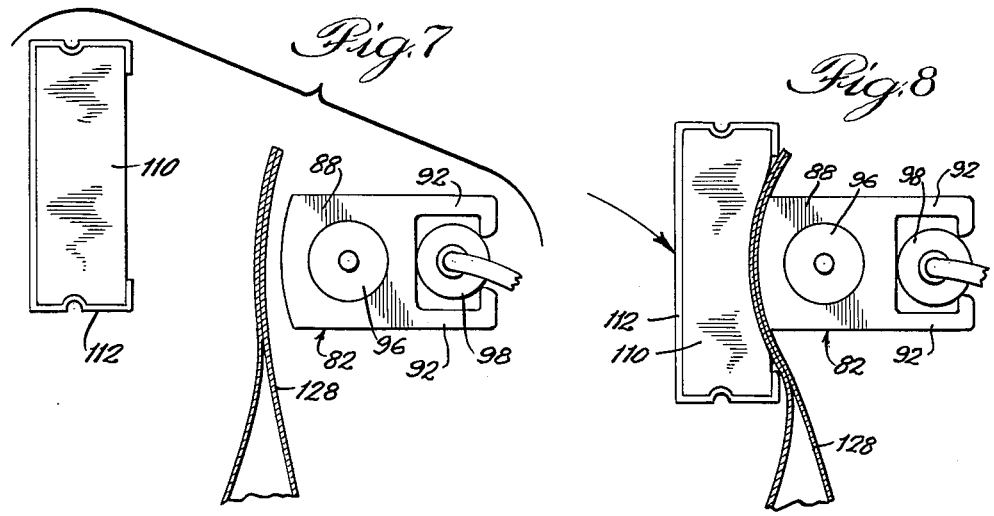

3,092,018
PLASTIC HEAT SEALER
Arthur Allen Turner, South Minneapolis, Minn., assignor, by mesne assignments, to Studebaker Corporation, South Bend, Ind., a corporation of Michigan
Filed Oct. 2, 1961, Ser. No. 142,268
7 Claims. (Cl. 100—93)

This invention relates in general to heat sealers for plastic materials, and more particularly to a purely hand operated heat sealer for domestic use in sealing a polyester plastic.

Among the objects of the present invention is the provision of improved heat sealing apparatus for use in sealing plastics.

Another object of the present invention is the provision of a light-weight economical apparatus for domestic use in heat sealing bags of polyester plastic used for food storage and the like.

Another object of the invention is the provision of heat sealing apparatus which is manually operable without the use of pedal extremities for use in heat sealing plastics.

Still another object of the invention is the use of a resilient pressure strip for holding a plastic material in a proper heat sealing relationship with a heating element.

The objects of the invention are accomplished by the provision of two housings, which are movably related to each other and which permit a plastic material held in both hands to be aligned with an electrical heating element between the housings while one housing is moved by hand pressure. This causes a resilient heat resistant pressure strip carried by the one housing to engage the plastic against the heating element in a heat-sealing position with the pressure evenly distributed.

The novel features which are characteristic of the invention are set forth with particularity in the appended claims. The invention itself, however, both as to its organization and method of operation, together with further objects and advantages thereof, will best be understood by reference to the following description taken in conjunction with the accompanying drawings in which:

FIGURE 1 is a general perspective view of the heat sealing apparatus utilized in the present invention;

FIGURE 2 is an end elevational view taken along the line 2—2 of FIGURE 1 and showing the apparatus in its unoperated position;

FIGURE 3 is a cross-sectional view similar to FIGURE 2, but showing the heat sealing apparatus in its operated position;

FIGURE 4 is a sectional view taken through the line 4—4 in FIGURE 2;

FIGURE 5 is a sectional view taken through the line 5—5 in FIGURE 4;

FIGURE 6 is a side elevational view partly in section to illustrate portions of the heating assembly;

FIGURE 7 is a partial view showing the relationship of the heating bar, plastic and holding element before operation of the apparatus; and FIGURE 8 is a partial view similar to FIGURE 6 showing the heating bar, plastic and holding element in heat sealing relationship.

In FIGURE 1, the heat sealing apparatus or assembly is indicated by the reference character 20. The assembly 20 comprises a cover housing 22 and a base housing 24. The cover 22 is preferably of polypropylene or similar heat resistant material capable of facile fabrication and of pleasing appearance while the base 24 is preferably a heat resistant grade phenolic. As shown, the two housings 22 and 24 are supported in a semi-vertical position on a pair of brackets 26. An electrical cord 28 is shown at one end of the assembly 20 for extending electrical power to the heating components of the assembly.

The base housing 24 comprises a top wall 30, end walls 32, a back wall 34, and a bottom or stop wall 36. The electrical cord 28 is brought through an aperture in one of the end walls 32, and a suitable strain relief element 37 is provided in the aperture.

The cover housing 22 comprises a longitudinal wall 38 from which a wall 40 and ribs 42 project along opposite edges of wall 38. The ribs 42 which may act as stops define therebetween a series of apertures 44 through which the interior of the assembly 20 may be viewed. The ribs 42 terminate in a longitudinal ledge 46 substantially parallel to wall 38. A projecting flange or wall 48 is provided on ledge 46 and it nests just below the wall 30 of the base housing 24.

The wall 40 joins with a substantially transverse wall 49 lying in a plane spaced apart from the wall 38 and a longitudinal insertion slot or passageway 50 is provided in wall 40 along its lower edge. The wall 49 is provided with a series of longitudinal recesses or corrugations 51 for decorative purposes. Wall 49 terminates in perpendicular wall section 52, just beneath the plane of wall 36. A set of end walls 54 enclose the opposite ends of the cover housing 22 and are nested between the end walls 32 of base housing 24.

The two housings 22 and 24 are linked together by a pair of spaced-apart wire link assemblies 56 and 58. The wire link assemblies 56 and 58 each comprise a substantially U-shaped wire link 62. Each link 62 has a longitudinal leg 64 at the back or crossbar of the U and short legs 66 on opposite ends of each leg 64. The short legs 66 each terminate in a perspective loop 68. The short legs 66 of link assembly 58 are joined by a link plate 69. A pair of respective split flanges 70 are carried by both walls 40 and 49 and these permit the longitudinal leg 64 of the links to be snapped into pivotal engagement with the flanges on cover 22. If desired, a link retainer clip may be used on flanges 70 to retain the legs 64 in position.

The wall 34 carries respective pairs of posts 72 and 74 in spaced-apart positions, and each post has a pin 75 for engaging a respective loop 68. The pins 75 thus pivotally support the links 62 on wall 34. The posts 74 each carry a stop element 76 for engaging the link 62 of link assembly 56. The links 62 thus hinge the housing 22 on housing 24 to permit translational movement of housing 22 relative to the housing 24 with the greatest separation therebetween dependent on the position of the stops 76.

In addition, walls 49 and 34 each have a respective ring-shaped or annular boss 77 thereon, into which opposite ends of a coiled spring 78 are received. The coiled spring 78 biases the housing 22 away from the wall 34 on housing 24 so that the leg 64 of each assembly 56 and 58 is rotated from right to left about pin 75 as seen in FIGURES 2 and 3, until leg 64 of assembly 56 encounters stops 76. The bosses 77 on respective walls 49 and 34 are then displaced from a common axis as shown in FIGURE 2 when the housings 22 and 24 are in their normal position.

A pair of transverse longitudinal walls 80 on wall 34 extends between the posts 74 and partially enclose a heating assembly 82. The heating assembly 82 is supported at opposite ends by a transverse shelf section 84 between the walls 80. Respective U-shaped shelf sections 86 are provided on the post 74 spaced slightly above shelves 84. One of the walls 80 is provided with a plurality of spaced-apart tabs or fingers 87 extending longitudinally across the wall.

The heating assembly 82 comprises a longitudinally extending heater bar 88 which may be of aluminum having a central aperture 90 and depending legs 93. Its ends 91 are encased in an insulating sleeve or tube 92 of fiber glass, for example, impregnated with a silicon resin. The sleeves 92, together with the bar 88 rest on shelves 84 with the sleeves 92 projecting beyond the heating bar and tightly engaging a respective U-shaped shelf 86 to hold the heating assembly 82 in position between walls 80.

A heating element 96 extends through the aperture 90, and it is provided with a thermostatic or bimetal element 98 located between the legs 93 of bar 88. The bimetal element 98 is adapted to open the circuit to the heating element 96 in the event its temperature exceeds a predetermined limit. Leads 100 extend from opposite ends 91 of the heating element 96 with one lead extending through an insulating element 102 located below the bar 88 and between the walls 80. The leads 100 are connected to respective leads of the cord 28 by means of connectors 104. The connectors 104 are positioned adjacent a transverse wall section 106 of the housing wall 34 by means of a clip 108 which holds the leads in position.

A longitudinally extending pressure strip or holding element 110 preferably of siliconized sponge rubber is adapted to mate with the heating bar 88 when the sealing apparatus is operated. The pressure strip 110 is located adjacent one side of wall 38 by a spring clip 112 positioned between respective transverse wall sections 114 on wall 38.

As previously mentioned, the assembly 20 is supported on brackets 26. The brackets 26 each have a depending leg 116 which rests against a suitable support and a longitudinal leg 118 extending therefrom and resting on a suitable support. The longitudinal legs 118 each have an inverted upstanding V-shaped support member 120. The support members 120 each are provided with projections 122 that engage suitable apertures 124 in the wall 34. The assembly 20 is therefore supported on brackets 26 in a semi-vertical position by the V-shaped support member 120, which slightly tilts the assembly. The depending legs 116 prevent backward motion when pressure is applied to operate the assembly. Other suitable supports may be provided of course, such as screws, for example, extending through apertures 124 for mounting the assembly on a wall. In addition, transverse wall sections, such as 126, are provided on wall 34 to improve the stress characteristics of the assembly.

To operate the heat sealing apparatus 20, the cord 28 is connected to a source of electrical power and the heating element 96 is operated for several minutes to insure that the heating bar 88 is at the necessary temperature.

A polyester plastic bag 128, a portion of which is seen in FIGURES 7 and 8 containing food for storage, for example, and having an open end is grasped between the thumbs and opposing fingers of each hand. The open end of the bag 128 is then inserted through the slot 50 until it encounters appropriate stops such as the back edge of ribs 42. The operator observes the position of the bag with respect to the heating bar 88 through apertures 44, and on noting, the open side or ends are aligned with the heating bar 88, he pushes the back of his hands against the wall 49 to exert pressure against wall 49. The housing 22 therefore moves against the bias of spring 78 towards the housing 24. As this occurs, the housing 22 is translated downwards as the links 62 rotate to maintain the housing 22 moving along the desired path until stopped by wall 36 and the appropriate portions on wall 34. This movement brings the siliconized rubber pressure strip 100 into engagement with one side of the bag 128, and presses the sides of the bag against the aluminum heater bar. With the heat applied, the bag is held in position for 1½ to 2 seconds to seal the open side of the bag closed and thereafter the manual pressure against wall 49 is relieved. The compression spring 78 thereupon biases the housing 22 away from housing 24 and it moves back into its normal position.

While there has been shown and described a specific embodiment of the present invention, it will, of course, be understood that various modifications and alternative constructions may be made without departing from the true spirit and scope of the invention. Therefore, it is intended by the appended claims to cover all such modifications and alternative constructions as fall within their true spirit and scope.

What is claimed as the invention is:

1. In heat sealing apparatus for use in sealing a thermoplastic bag having an open end, the improvement comprising a first housing, a second housing, a heater bar, a heating element carried by said bar, a pair of spaced-apart shelves in one of said housings for carrying said heater bar, a U-shaped shelf adjacent one end of each spaced-apart shelf, an insulating sleeve encircling each end of said heater bar and tightly engaging a respective one of said U-shaped shelves to hold said heater bar in one position, a pressure strip supported in the other housing, slot means formed in one of said housings for enabling the open end of said thermoplastic bag to be placed between said pressure strip and said heater bar, and pressure responsive means for enabling a predetermined movement of one of said housings toward the other housing to bring the heater bar and pressure strip into firm contact with the open end of said thermoplastic bag for causing the latter to be heat sealed.

2. The improvement of heat sealing apparatus in accordance with claim 1 wherein said pressure responsive means for enabling a predetermined movement comprises a pair of U-shaped wire links with the legs of each U-shaped wire link being pivotally engaged at spaced-apart positions on one of said housings, and the cross bar of each U-shaped wire link being pivotally engaged at spaced-apart positions on the other housing.

3. In heat sealing apparatus for use in sealing the open end of a thermoplastic bag, the improvement comprising a first housing having a wall section with a passage way formed therein to permit the insertion therethrough of the open end of a thermoplastic bag when said bag is held between the thumb and opposed finger of each hand, a second housing, a heater bar supported in said second housing in a position permitting alignment of said bag open end with said heater bar when the bag open end is inserted through said passageway, a pressure strip supported in the first housing in a predetermined position relative to said heater bar, and a pair of spaced-apart links each being pivotally connected to each housing for rotation in opposite directions relative to each other when the housings are moved toward each other to bring the pressure strip into heat-sealing engagement with said heater bar with said thermoplastic bag therebetween for sealing said bag open end in response to the application of hand pressure to said wall section.

4. Heat sealing apparatus in accordance with claim 3 further comprising spring means mounted between said first and second housings for biasing said housings to bring said pressure strip into said predetermined position.

5. Heat sealing apparatus in accordance with claim 3 wherein one of said housings is formed with an aperture therein to permit the visual observation of the position of the bag open end relative to said heater bar prior to the heat-sealing operation.

6. The improvement of heat sealing apparatus for use in sealing one thermoplastic material to another comprising a pair of housings, a resilient heat resistant member carried by one of said housings, a heater bar carried by the other of said housings, a pair of spaced-apart, pivoted link members having their axes of rotation parallel to each other, each of said pivoted link members being pivotally connected to each of said pair of housings to permit relative movement therebetween, said links being mounted to rotate in opposite directions relative to each other, biasing means positioned between said housings to maintain them normally spaced from each other, and manual pressure receiving means on one housing for causing said pivoted link members to rotate in opposite directions to thereby move said one housing with respect to the other housing along a predetermined path for engaging said heat resistant material with said thermoplastic materials and against said heater bar under evenly distributed pressure conditions.

7. The improvement of heat sealing apparatus for use in sealing one thermoplastic material to another comprising a movable first housing, said movable first housing having a slot formed therein for receiving the thermoplastic materials to be sealed, and further having a manual pressure receiving portion adjacent said slot, a stationary second housing, a resilient heat resistant member carried by one of said housings, heating means carried by the other of said housings, a pair of spaced-apart link members within said housings, said spaced-apart link members being pivotally connected to said housings to permit relative movement therebetween, spring biasing means positioned between pairs of said housings to maintain them normally spaced from each other and adapted to be overcome by the application of manual pressure against said manual pressure receiving portion for enabling said movable first housing to be moved toward said stationary second housing, said link members being rotated in opposite directions by the movement of said first housing toward said second housing for guiding said movable first housing movement along a predetermined path relative to said stationary second housing.

References Cited in the file of this patent

UNITED STATES PATENTS

| | | |
|---|---|---|
| 2,103,945 | Henley | Dec. 28, 1937 |
| 2,343,117 | Vincent | Feb. 29, 1944 |
| 2,719,567 | Gardner | Oct. 4, 1955 |
| 2,822,030 | Pokras | Feb. 4, 1958 |
| 2,958,368 | Dreeben | Nov. 1, 1960 |